United States Patent

Mathews et al.

[11] Patent Number: 5,978,168
[45] Date of Patent: Nov. 2, 1999

[54] MR HEAD DIFFERENTIAL MICRO-JOG

[75] Inventors: Harlan Mathews, Boulder; James A. Valent, Longmont, both of Colo.

[73] Assignee: Maxtor Corporation, Longmont, Colo.

[21] Appl. No.: 08/798,606

[22] Filed: Feb. 11, 1997

Related U.S. Application Data

[63] Continuation of application No. 08/484,770, Jun. 6, 1995, abandoned.

[51] Int. Cl.$^6$ .................................................. G11B 5/596
[52] U.S. Cl. ............................. 360/77.04; 360/77.08; 360/76
[58] Field of Search ............................. 360/77.04, 78.05, 360/77.08, 77.05, 77.06, 77.07, 77.02, 76

[56] References Cited

U.S. PATENT DOCUMENTS

| | | | |
|---|---|---|---|
| 4,488,187 | 12/1984 | Alaimo | 360/77.08 |
| 4,638,384 | 1/1987 | Stewart et al. | 360/77.05 |
| 4,802,033 | 1/1989 | Chi | 360/77.04 |
| 4,812,929 | 3/1989 | Stewart et al. | 360/77.07 |
| 4,982,295 | 1/1991 | Yakuwa et al. | 360/77.04 |
| 5,073,833 | 12/1991 | Best | 360/77.04 |
| 5,235,478 | 8/1993 | Hoshimi | 360/77.08 |
| 5,347,410 | 9/1994 | Narita et al. | 360/77.04 |
| 5,353,170 | 10/1994 | Fung | 360/77.04 |
| 5,369,535 | 11/1994 | Hetzler | 360/78.14 |
| 5,459,853 | 10/1995 | Best | 395/441 |
| 5,500,776 | 3/1996 | Smith | 360/77.04 |
| 5,521,773 | 5/1996 | Suzuki | 360/77.04 |
| 5,587,850 | 12/1996 | Ton-that | 360/77.08 |
| 5,596,463 | 1/1997 | Hashimoto | 360/104 |
| 5,786,957 | 7/1998 | Inoue et al. | 360/77.08 |

FOREIGN PATENT DOCUMENTS

| | | | |
|---|---|---|---|
| 479703 | 4/1992 | European Pat. Off. | 360/77.08 |
| 89622 | 4/1993 | Japan | 360/77.04 |

*Primary Examiner*—Alan Faber
*Attorney, Agent, or Firm*—Sheridan Ross P.C.

[57] ABSTRACT

A head positioning system accurately positions a read/write head along a selected track of a rotating magnetic disk. In one aspect, servo information is embedded along the track with the centerline of the servo information offset a radial distance from the centerline of data stored or written along the track. The head positioning system micro-jogs the read/write head a first and a second radial distance from the centerline of servo information for a read operation and a write operation.

20 Claims, 7 Drawing Sheets

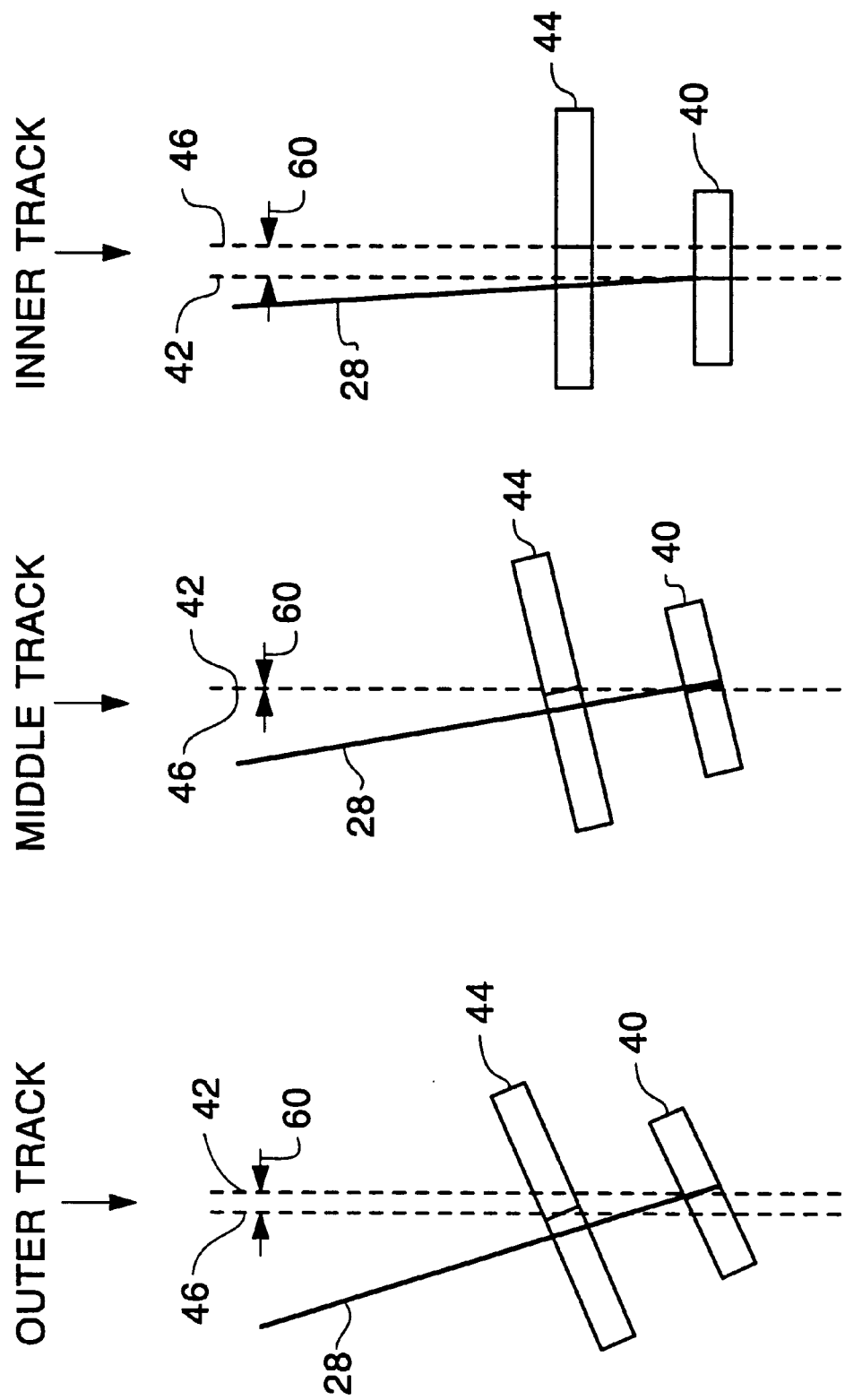

MR HEAD DIFFERENTIAL MICRO-JOG

This is a continuation of application Ser. No. 08/484,770, filed on Jun. 6, 1995 now abandoned.

FIELD OF THE INVENTION

The present invention generally relates to the field of magnetic disk data storage systems and, more particularly, to systems for positioning a read/write head along a selected track of a rotating magnetic disk.

BACKGROUND OF THE INVENTION

Magnetic disk data storage systems generally include a rotating magnetic disk and a read/write head that reads and writes data along concentric tracks on the magnetic disk. Some read/write heads use a separate magnetoresistive read element for reading data and a thin film write element for writing data. The read element is optimized for reading data stored on the magnetic disk while the write element is optimized for storing data on the magnetic disk. This optimization often includes making the read element significantly narrower than the write element to avoid erroneously reading data stored in tracks adjacent to a selected track and to allow narrow track widths for high density data storage.

The read/write head is generally attached to an end of an actuator arm that is rotated across the disk to a selected track. As the head is rotated it becomes skewed relative to the tracks. To compensate for the skew angle the read element is sometimes displaced laterally from the write element.

The head is positioned by a head positioning system that causes the head to seek to a selected track and then precisely centers the head over the data stripe area in the track. Some positioning systems generate servo signals using servo information embedded within a portion of each track for determining the position of the head within a track. The head is centered over the servo information to align the head with the data. To compensate for the displacement between the read and write elements, the head is offset from the servo information to center the write element over the data stripe area for a write operation and to center the read element over the data for a read operation.

A limitation of many of these head positioning systems is that the head position signal becomes nonlinear as the narrow read element is offset from the servo information to the head position required for a read operation and/or a write operation. A nonlinear position signal reduces the accuracy with which the head can be positioned, causing a corresponding increase in the error rate for reading data. Consequently, there is a need for a head positioning system that accurately positions the head at all predetermined positions within all tracks.

SUMMARY OF THE INVENTION

The present invention provides a head positioning system for accurately positioning a read/write head along a selected track of a rotating magnetic disk. In particular, the present invention improves the accuracy with which a radial position signal is generated from servo information provided along the selected track. The improved radial positioning of the head during a read operation decreases the error rate for reading data. Additionally, the improved radial positioning of the head during a write operation enables an increase in the storage density of the disk. Other advantages will be apparent upon consideration of the following description.

The invention encompasses an apparatus and a methodology for accurately positioning the read/write head for reading and writing data along the selected track.

The various aspects of the present invention are embodied in a magnetic head positioning system that includes a magnetic disk, a magnetic read/write head, servo information embedded within at least one track, and preferably each track, of the disk, and a controller for radially positioning the head along the disk relative to the servo information.

The controller includes a rotary actuator. The head is mounted to an end of the rotary actuator and rotated across the disk to radially position the head over a selected track. The head includes a read element and a write element. The read element can include a magnetoresistive type element and the write element can include a ferrite inductive or a thin film inductive type element. The read and write elements are displaced along and/or across the head from each other.

As the head is rotated across the disk, the displacement between the read and write elements translates into radial and/or circumferential displacements from each other relative to the disk. The radial and/or circumferential displacements generally vary as a function of the radial position of the head along the disk. Generally, as the head is radially moved from an outer radial position/track to an inner radial position/track on the disk, the read element transitions from being radially displaced on one side of the write element, to being radially aligned with the write element, and then to being radially displaced on the other side of the write element.

To compensate for the radial displacement, the head is micro-jogged to a radial offset from the servo information centerline to center the write element over the data centerline for a write operation and to center the read element over the data centerline for a read operation.

The read element develops a position signal for the position of the head relative to the servo information. The servo information can include first servo information on one side of the centerline and second servo information on the other side of the centerline. The position signal is generated by the read element sensing the first and second servo information. Generally, the radial position of the centerline of the servo information is defined as where the read element equally senses the servo information on both sides of the centerline and thereby develops a substantially zero differential signal. However, the present invention includes defining the radial position of the data information centerline to correspond to a predetermined non-zero differential signal.

According to one aspect of the present invention, the servo information centerline is radially offset from the data centerline. In this manner, as the head is micro-jogged to a radial offset from the servo information centerline, the distance that the servo information centerline is moved across the read element is minimized. It has been found that by maintaining the servo information centerline near the center of the read element, and in particular maintaining the servo information centerline away from the ends of the read element, the read element generates an accurate, generally linear, position signal as the head is micro-jogged for a write and/or a read operation.

Preferably, the distance that the servo information centerline is radially offset from the data centerline is substantially equal to one half of the radial displacement distance between the read and write elements. This centerline offset distance minimizes the distance that the servo information centerline is moved across the read element as the read element is micro-jogged during a read and/or write operation. In this manner, the read element generates an accurate, substantially linear, position signal as the read element is micro-jogged for a write and/or read operation.

In one embodiment, the controller micro-jogs the center of the read element a first micro-jog distance from one side of the servo information centerline for a read operation and a second micro-jog distance from the other side of the servo information centerline for a write operation. The first and second micro-jog distances are made substantially equal when the servo information centerline is radially offset from the data centerline by one half of the radial displacement distance between the read and write elements as noted above. In this manner, the center of the read element is jogged between opposite sides of the servo information centerline thereby minimizing the distance between the center of the read element and the servo information centerline.

As noted above, the radial displacement between the read and write elements varies as the head is radially moved from an outer track to an inner track on the disk. In another embodiment, the controller measures the radial displacement distance between the read and write elements for a track on the disk. The controller then calculates the first micro-jog distance corresponding to the distance that the read element is moved from the servo information centerline to align the read element with the data centerline and the second micro-jog distance that the read element is moved to align the write element with the data centerline. The controller than radially positions the read element the first micro-jog distance for a read operation and the second micro-jog distance for a write operation along the track. In this manner, the read and write elements are accurately positioned relative to data along the track.

In another aspect of the present invention, a methodology is provided for accurately positioning the read and write elements of the head for read and write operations.

According to one embodiment, the methodology includes the steps of measuring the radial displacement distance between the read and write element for a track location and calculating the above-noted first and second micro-jog distances.

The controller begins by aligning the read element at a predetermined nominal offset from the servo information centerline for a particular track. The write element then writes a stripe of test data. The controller then moves the read element while reading data until the error rate for the data read is minimized. The error rate is minimized when the read element is substantially aligned with the data centerline. The controller then records the distance that the read element was moved between the servo information centerline and the data centerline. The recorded distance equals the radial displacement between the read and write elements for the track. The controller then calculates the first and second micro-jog distances. Generally, the first and second micro-jog distances equal one half of the measured radial displacement between the read and write elements.

For subsequent read operations along the track, the controller micro-jogs the read element the calculated first micro-jog distance to align the read element with the data centerline. Likewise, for a subsequent write operation along the track, the controller micro-jogs the read element the calculated second micro-jog distance to align the write element with the data centerline.

The methodology can further include the step of similarly measuring the radial displacement between the read and write elements and calculating the first and second micro-jog distances for a plurality of tracks. The method of calculation includes interpolation or extrapolation between the measured radial displacement for a plurality of tracks to determine a first and second micro-jog distance for each track on the disk. The accuracy of the method of calculation can be generally improved by measuring the displacement at an outward track, a middle track, and an inner track. The method further includes developing a table of the first and second micro-jog distances for each track position.

As can be appreciated, the present invention provides an accurate, substantially linear, position signal while the read/write head is micro-jogged during read and write operations. As can further be appreciated, the accurate positioning of the read and write elements can reduce the error rate for reading data and provide more accurate positioning of written data stripes, thereby allowing increased storage density.

BRIEF DESCRIPTION OF THE DRAWINGS

For a more complete understanding of the present invention and further advantages thereof, reference is now made to the following Detailed Description, taken in conjunction with the Drawings, in which:

FIGS. 5, 6, 7 are explanatory diagrams illustrating the variation of the offset distance between the center of the read element and the center of the write element for three track locations on the magnetic disk;

DETAILED DESCRIPTION OF THE INVENTION

Figure 1:
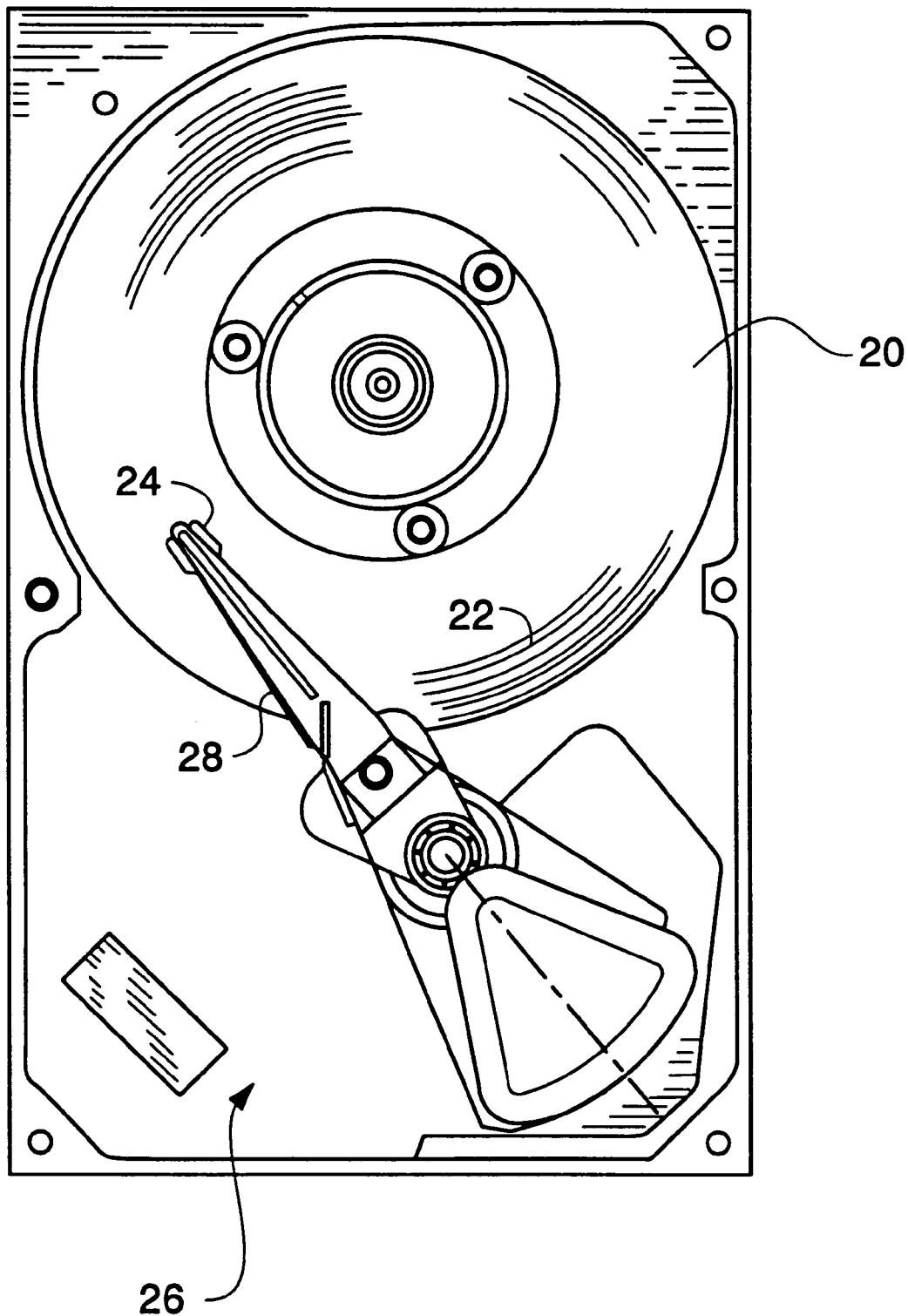
FIG. 1 is a top view of a magnetic disk data storage system according to the present invention.

A magnetic data storage system is illustrated in FIG. 1. The magnetic data storage system includes a magnetic disk 20 having a plurality of tracks 22, a read/write head 24, servo information embedded within each track 22, and a head positioning controller 26 for radially positioning the head 24.

Figure 2:
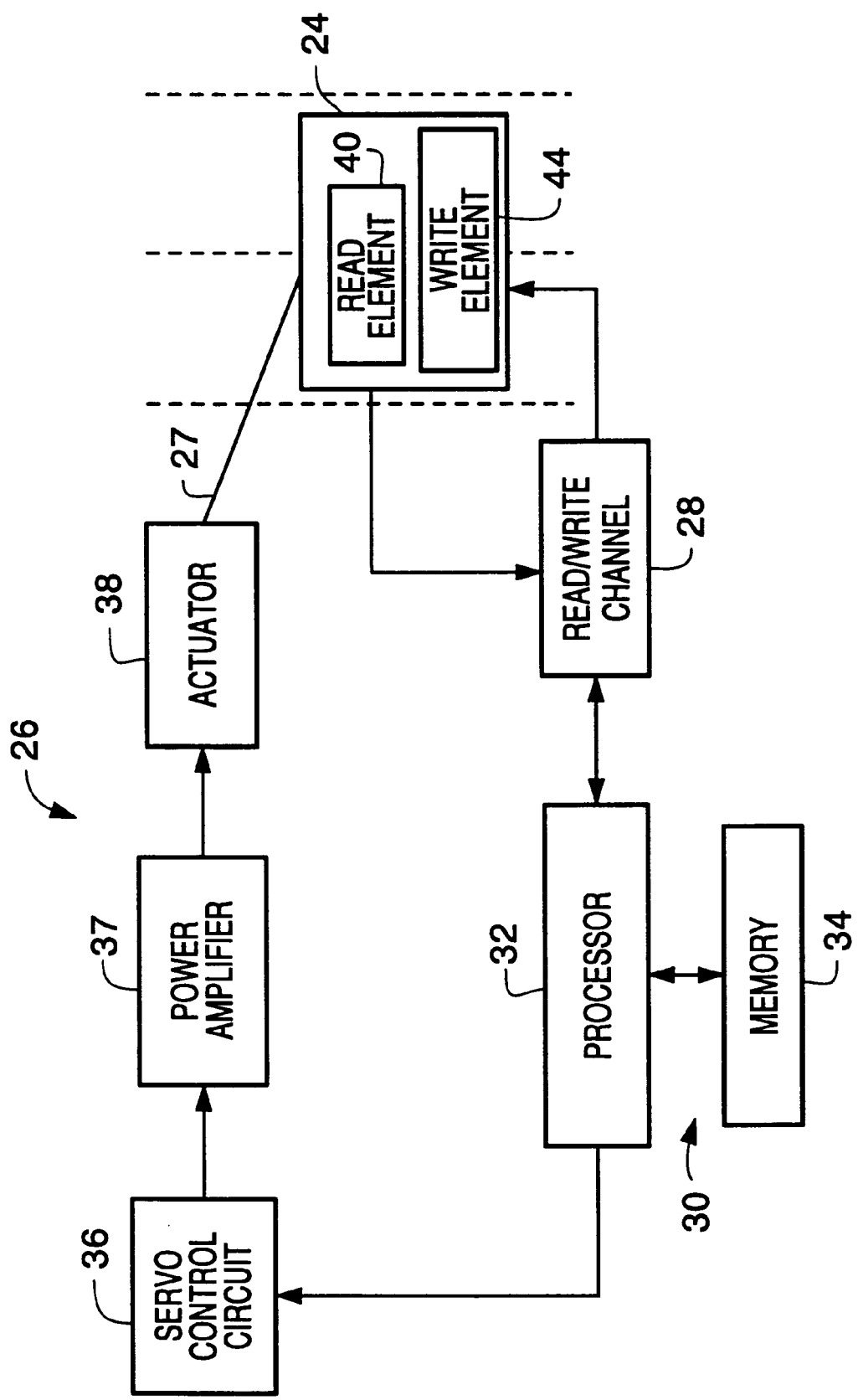
FIG. 2 is a block diagram of a head positioning controller according to the present invention.

The head positioning controller 26 rotates an actuator arm 27 having the head 24 across the disk 20 to radially position the head 24 over a selected track for reading or writing data or servo information. An embodiment of a controller 26 according to the present invention is illustrated in FIG. 2. The controller 26 includes a read/write channel 28, a position controller 30 having a processor 32 and a memory 34, a servo control circuit 36, a power amplifier 37, and an actuator 38. The head 24 includes a read element 40 and a write element 44. During a write operation, the read/write channel 28 drives the write element 44 to write data along a track. During a read operation, the read element 40 senses stored data and outputs data signals that are amplified by the read/write channel 28.

The controller 26 selects a track for writing or reading and accurately positions the head 24 within the track. The read element 40 senses servo information 52 (FIG. 3) that is embedded in sectors of each track 22. The read/write channel 28 amplifies the sensed servo information and provides the servo information to the position controller 30. The position controller 30 uses the servo information to determine the radial position of the read element 40 relative to that portion of the track 22 having the servo information. The position controller 30 outputs a position error signal corresponding to the measured radial position of the read element 40 to the servo control circuit 36. The servo control circuit 36 translates the position error signal into a correction signal that is amplified by the power amplifier 37 and provided to the actuator 38 to move the read element 40 a distance corresponding to the position error signal. In this manner, the controller 26 accurately positions the head 24 relative to the servo information in a selected track. As will described in detail below, the position controller 30 regulates the position error signal provided to the servo control circuit 36 to accurately position the read and write elements 40 and 44 at predetermined positions in a selected track for a read and a write operation.

Figure 3:
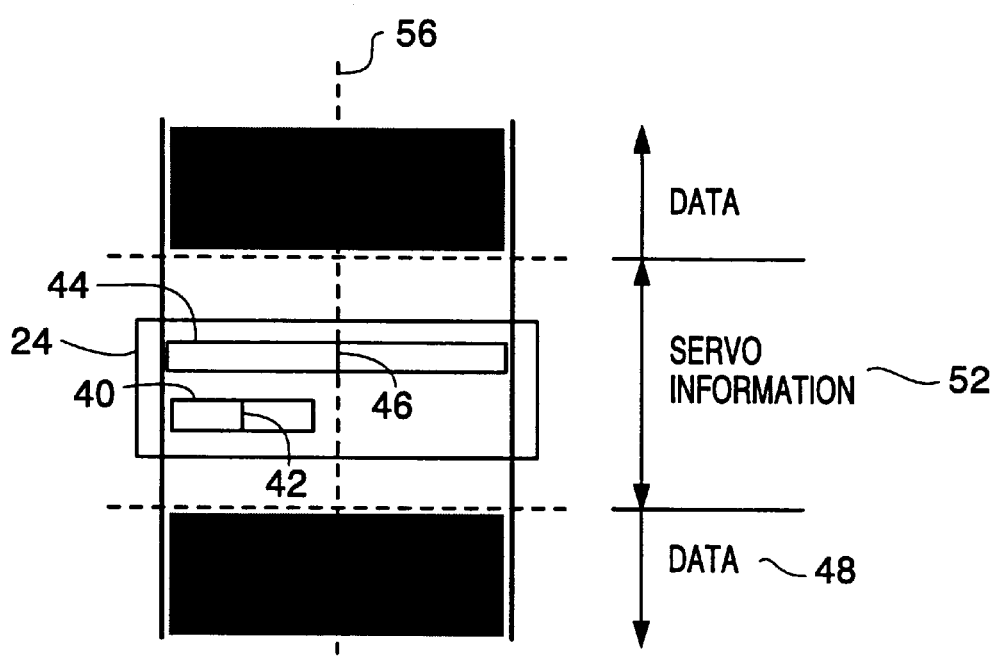
FIG. 3 illustrates the positioning of the write element for a write operation in an inner track location.

FIG. 3 illustrates the positioning of the head 24 along a selected track. As illustrated, the read element 40 having a center 42 is offset circumferentially and radially relative to the disk from the write element 44 having a center 46. For a write operation, the write element 44 writes data 48 along a track. The radial position of the data centerline 56 generally corresponds to the center 46 of the write element 44 during the write operation. During a read operation, the center 42 of the read element 40 is centered over the data centerline 56 as illustrated in FIG. 4 to minimize the error rate for reading the data 48.

Figure 4:
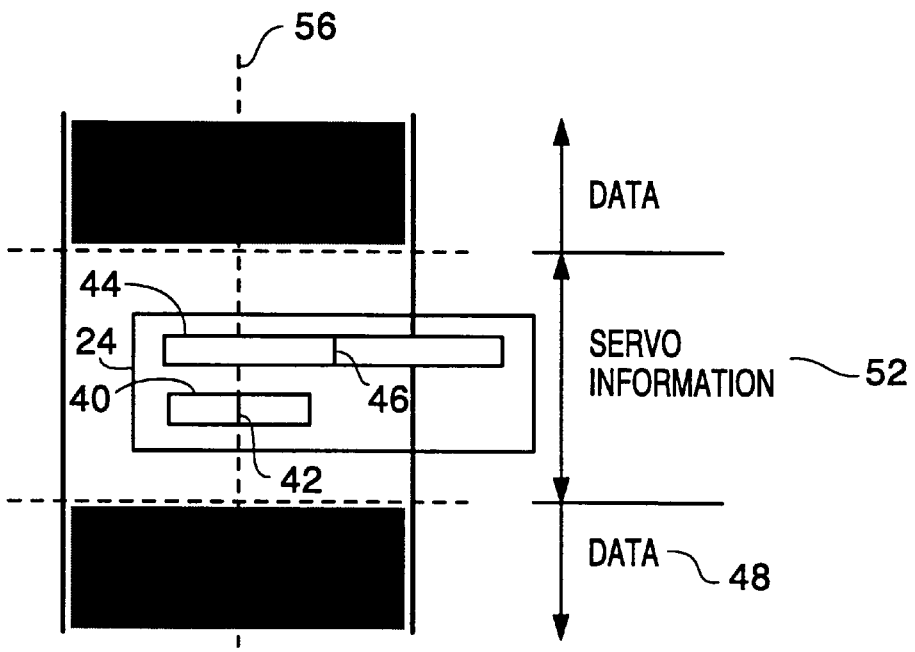
FIG. 4 illustrates the positioning of the read element for a read operation in an inner track location.

To compensate for the radial offset between the read and write element centers 42 and 46, the position controller 30 jogs the head 24 so as to position the write element center 46 over the data centerline 56 for a write operation (FIG. 3) and to position the read element center 42 over the data centerline 56 for a read operation (FIG. 4).

The distance that the position controller 30 jogs the head 24 between a read and a write operation varies with the radial position of the head 24 on the disk 20. With reference to FIGS. 5–7, the variation in the element offset distance 60 between the read and write element centers 42 and 46 is illustrated for an outer, a middle, and an inner track position on the disk 20. As the head 24 is radially moved from the outer track to the inner track, the read element center 42 transitions from being on one side of the write element center 46 for the outer track (FIG. 5), to being radially aligned with the write element center 46 for the middle track (FIG. 6), and then to being on the other side of the write element center 46 for the inner track (FIG. 7).

Figure 8:
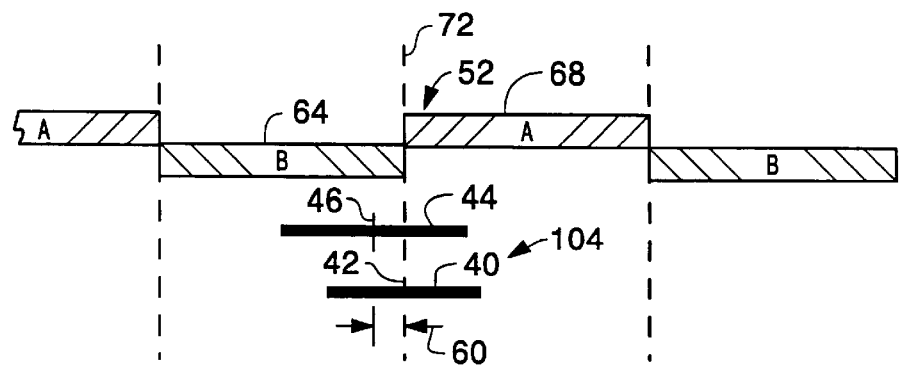
FIG. 8 illustrates the read and write elements positioned relative to the centerline of the servo information.
Figure 9:
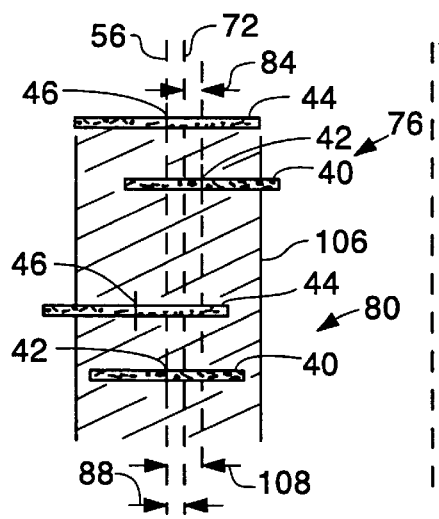
FIG. 9 illustrates the read element jogged relative to the centerline of the servo information for a write operation and a read operation.
Figure 10:
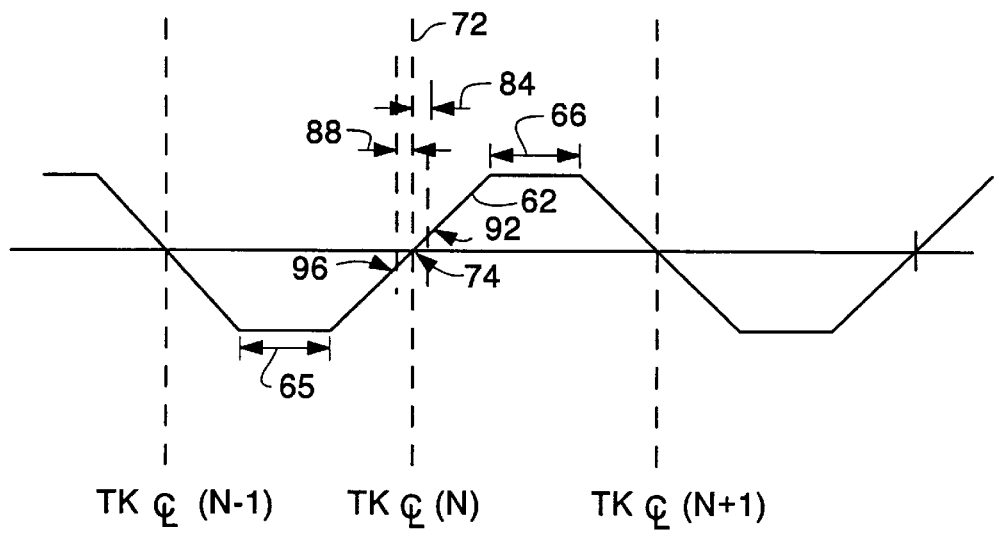
FIG. 10 is a graph of the differential position signals generated as the read element is moved relative to the centerline of the servo information.

With reference to FIGS. 8–10, the controller 26 jogs the head 24 using a position error signal 62 (FIG. 10) that is generated from the servo information 52 (FIG. 8) sensed by the read element 40. It is noted that the position error signal 62 for each track is determined by the controller 26 during a drive calibration process that is performed upon power-up of the disk drive. The servo information 52 includes first servo information 64 on one side of a track centerline 72 and second servo information 68 on the other side of the track centerline 72. The servo demodulation portion of the read channel 28 generates the position error signal 62 by the read element 40 differentially sensing the first and second servo information 64 and 68 and producing a differential voltage as a function of distance from the track centerline 72.

Preferably, the radial position of the track centerline 72 of the servo information 52 is defined as where the read element 40 equally senses the first and second servo information 64 and 68 on both sides of the track centerline 72 and thereby develops a substantially zero differential position error signal 74 (FIG. 10). However, the present invention includes defining the radial position of the data track centerline 56 to correspond to a predetermined non-zero differential position error signal 62.

As illustrated in FIG. 10, the differential position error signal 62 becomes non-linear in the regions 65 and 66 as the track centerline 72 approaches the ends of the read element 40. To maintain an accurate, substantially linear, position error signal 62 the controller 26 minimizes the distance that the track centerline 72 is moved from the read element center 42 during a read and a write operation.

As illustrated in FIG. 9, the read and write elements 40 and 44 are jogged relative to the track centerline 72 for a write operation 76 and a read operation 80. The controller 26 jogs the read element center 42 a first micro-jog distance 84 from one side of the track centerline 72 for the write operation 76 and a second micro-jog distance 88 from the other side of the track centerline 72 for the read operation 80.

Preferably, the first and second micro-jog distances 84 and 88 are made substantially equal by radially offsetting the data centerline 56 from the track centerline 72 by one half of the element offset distance 60 (FIG. 8). In this manner, the read element center 42 is jogged between opposite sides of the track centerline 72 thereby minimizing the distance between the read element center 42 and the track centerline 72. The first and second micro-jog distances 84 and 88 correspond to the linear position signals 92 and 96 (FIG. 10).

Figure 11:
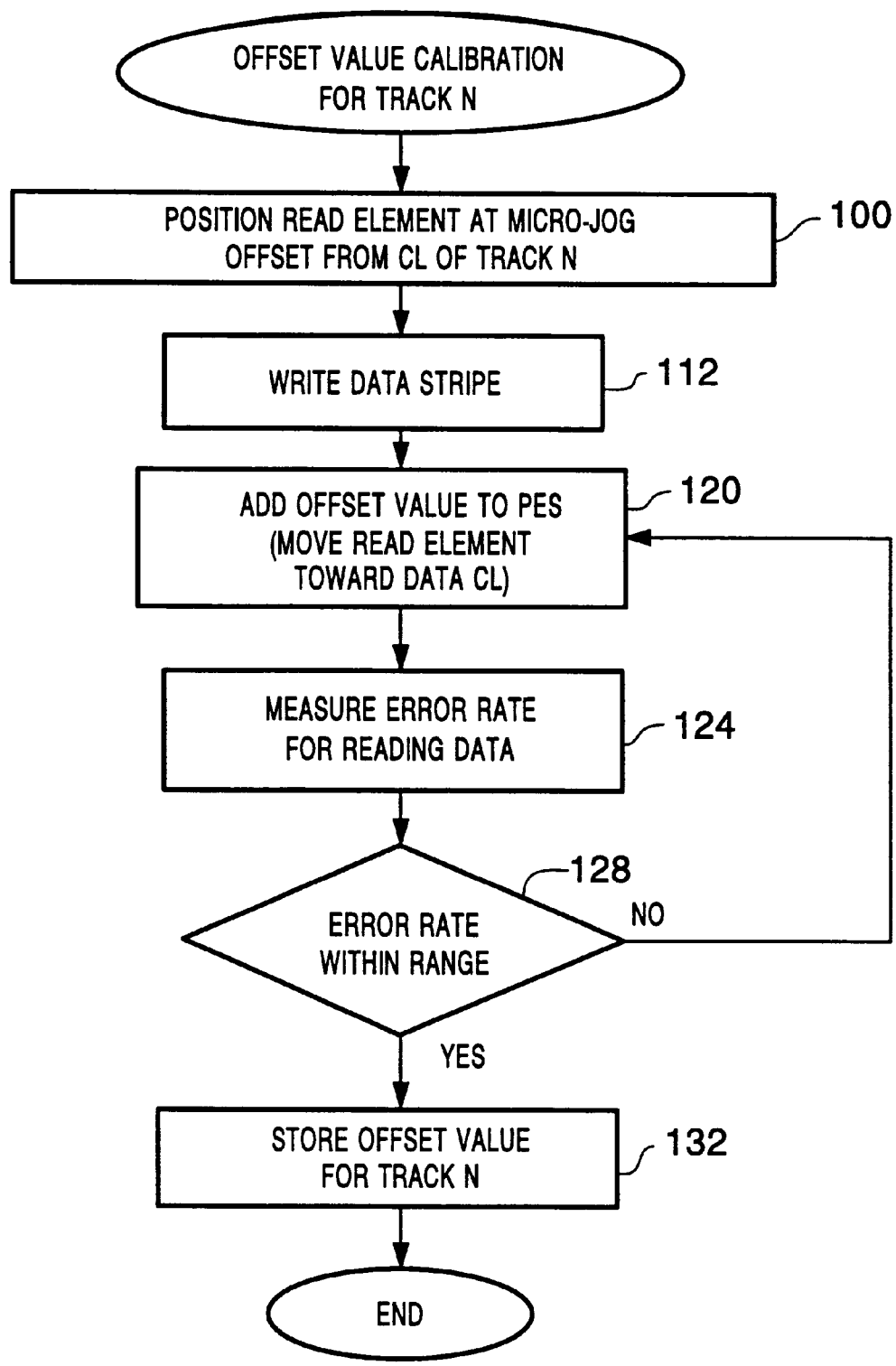
FIG. 11 is a flowchart showing the process for measuring the head micro-jog positions for a track.

To compensate for the variation of the element offset distance 60 with track location on the disk 20, the controller 26 measures the element offset distance 60 and then calculates the first and second micro-jog distances 84 and 88 for a plurality of track locations on the disk 20 according to the steps in FIG. 11.

As indicated by step 100, the controller 26 begins by aligning the read element 40 with the track centerline 72 for a track. FIG. 8 diagrammatically illustrates this alignment by means of reference no. 104. In further accordance with step 100, the controller 26 then moves the read element 40 a micro-jog distance on one side of the track centerline 72 as illustrated by means of reference no. 76 in FIG. 9. This micro-jog distance is precalculated by the controller 26 and stored as a digital number for the track based on a theoretical calculation of the element offset distance 60 for the track. The position controller 30 positions the read element 40 relative to the position error signal for the track. In accordance with step 112, the controller 26 then writes a stripe of test data 106 with the write element 44. The position controller 30 adds a head offset value to the position error signal to cause the servo control circuit 36 to move the read element 40 toward the data centerline 56 (step 120). The position controller 30 measures the error rate 124 for reading the test data and adjusts the head offset value 120 until the error rate is within a predetermined range 128. The error rate is minimized when the read element 40 is substantially aligned with the data centerline 56, which is illustrated by means of reference no. 80 in FIG. 9. The distance 108 that the read element 40 was moved equals the measured element offset distance 60 (FIG. 8).

The head offset value is stored in the memory 34 for the measured track (step 132). The head offset value corresponds to the value that the position controller 30 adds to the position error signal to move the read element 40 a distance equal to the element displacement distance 60 for the first measured track. The position controller 30 calculates the first and second micro-jog distances 84 and 88 as one half of the head offset value (i.e., one half of the element offset distance 60).

Preferably, the position controller 30 measures the head offset values for at least an outer, a middle, and an inner track on the disk 20. The controller 30 then interpolates or extrapolates among the measured head offset values to calculate the head offset values for all remaining tracks on the disk 20. In this manner, the controller 30 develops a table of position offset values stored in the memory 34 for all tracks on the disk 20.

Figure 12:
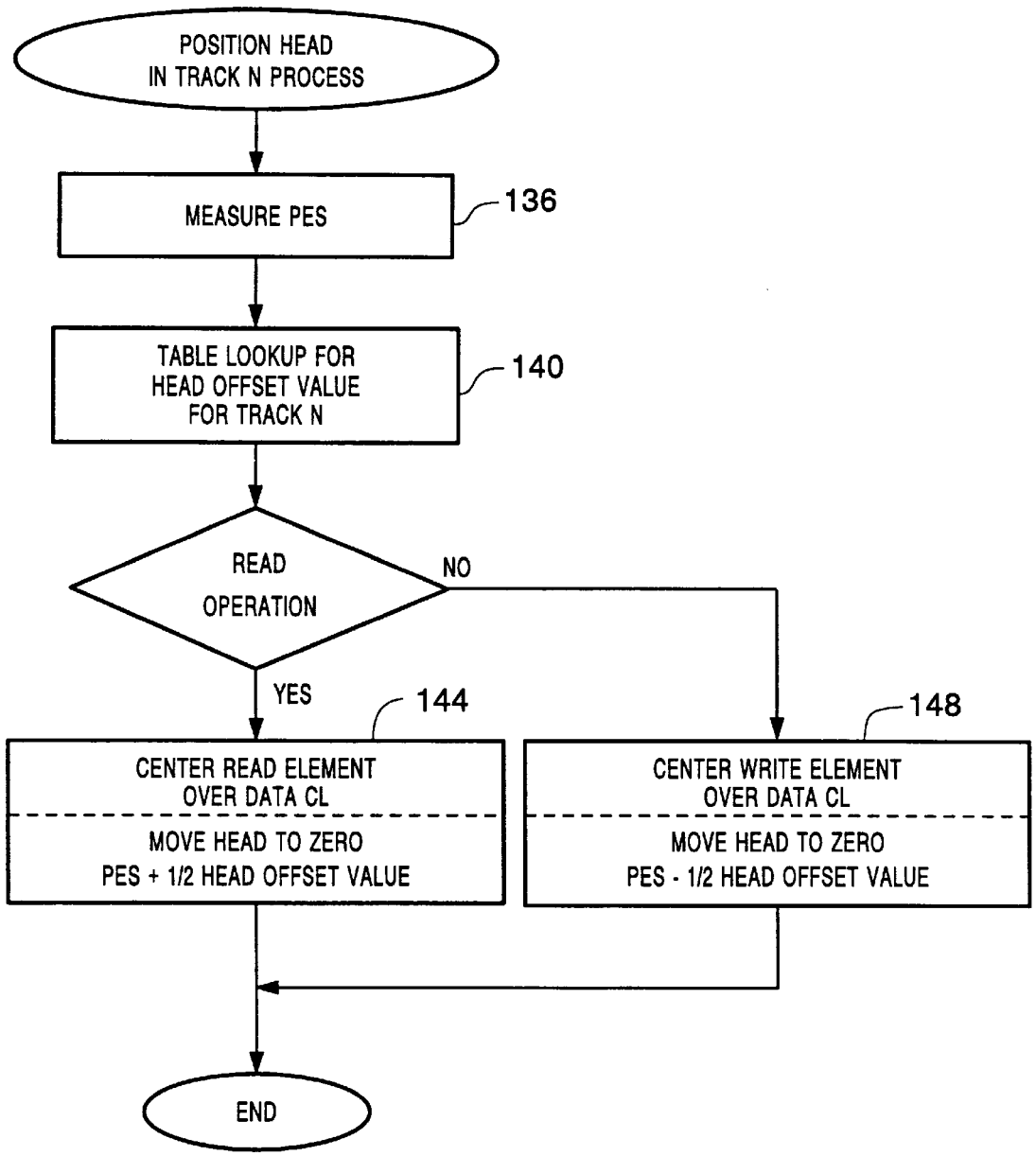
FIG. 12 is a flowchart showing the process for positioning the head for a read or a write operation.

The steps for jogging the head 24 for a read or a write operation are shown in FIG. 12. For a read or a write operation, the position controller 30 begins by measuring the position error signal corresponding to the present position of the read element 40 relative to the track centerline 72 of a selected track (step 136). Next, the position controller 30 looks at the table in memory 34 to determine the head offset value for a selected track (step 140). For a read operation the controller 30 adds one half of the head offset value to the position error signal (step 144). In this manner, the read element 40 is jogged the second micro-jog distance 88 from one side of the track centerline 72 to align the read element with the data centerline 56. Likewise, for a write operation the controller 30 subtracts one half of the head offset value from the position error signal (step 148). In this manner, the read element 40 is jogged the first micro-jog 84 distance from the other side of the track centerline 72 to align the write element 44 with the data centerline 56. Preferably, the read element 40 is micro-jogged during part of the seek process.

As can be appreciated, the present invention provides an accurate, substantially linear, position error signal while the head 24 is jogged during read and write operations. As can further be appreciated, the accurate positioning of the read and write elements 40 and 44 reduces the error rate for reading data and provide more accurate positioning of written data stripes, thereby allowing increased storage density.

The foregoing discussion has been presented for purposes of illustration and description. Further, the description is not intended to limit the invention to the form disclosed herein. Variation and modification commensurate with the above teachings, within the skill and knowledge of the relevant art, are within the scope of the present invention. The embodiments described herein above are further intended to explain the best modes presently known of practicing the invention and to enable others skilled in the art to utilize the invention as presented, or in other embodiments, and with the various modifications required by their particular applications or uses of the invention. It is intended that the appended claims be construed to include alternative embodiments to the extent permitted by the prior art.

What is claimed is:

1. A read/write head positioning system for use in a magnetic data storage system, comprising:
   a disk having a track;
   a read/write head movably positioned adjacent to said disk, said read/write head including a read element and a write element, said read element having a center;
   servo information embedded within a first portion of said track, said servo information having a servo information centerline; and,
   data stored along a second portion of said track when the center of said read element is radially offset a first microjog distance from said servo information centerline, said data having a data centerline radially offset a second microjog distance from said servo information centerline, said first microjog distance being in a first direction relative to said servo information centerline and said second microjog distance being in a second direction, opposite to said first direction, relative to the servo information centerline.

2. The head positioning system of claim 1, wherein:
   said read element is offset radially an element offset distance from said write element when said read/write head is radially positioned for one of said read operation and said write operation.

3. The head positioning system of claim 2, wherein:
   said second microjog offset distance is one half said element offset distance.

4. The head positioning system of claim 1, wherein:
   said servo information includes first servo information stored on one side of said servo information centerline and second servo information stored on an opposite side of said servo information centerline.

5. The head positioning system of claim 1, wherein:
   the center of said read element is positioned at said second micro-jog distance to radially center said read element relative to said data centerline for reading data.

6. The head positioning system of claim 1, wherein said first microjog distance has a magnitude and said second microjog distance has a magnitude, the magnitude of the first microjog distance being substantially equal to the magnitude of the second microjog distance.

7. The head positioning system of claim 1, wherein said first microjog distance and said second microjog distance vary between tracks.

8. The head positioning system of claim 1, further including a memory for storing said first and second microjog distances for each track.

9. The head positioning system of claim 1, wherein said read element is radially offset said first microjog distance from said servo information centerline through use of said servo information.

10. The head positioning system of claim 9, wherein said read element is radially offset said second microjog distance from said servo information centerline through use of said servo information.

11. In a magnetic data storage system, a method for positioning a read/write head for reading and writing data on a disk along a track defined thereon, said read/write head including a read element and a write element, said read element having a radial offset relative to the disk from said write element, said data having a data centerline, said method comprising the steps of:
   providing servo information along a first portion of said track, said servo information having a servo information centerline radially offset from said data centerline;
   read positioning said read element a second micro-jog distance from said servo information centerline to align said read element with said data centerline for performing a read operation along said track; and
   write positioning said read element a first micro-jog distance from said servo information centerline to align said write element with said data centerline for performing a write operation along said track.

12. The method of claim 11, wherein:

said read positioning step includes positioning said read element said second micro-jog distance on one side of said servo information centerline; and said write positioning step includes positioning said read element said first micro-jog distance on an opposite side of said servo information centerline.

13. The method of claim 12, wherein:

said first micro-jog distance that said read element is positioned is substantially equal to said second micro-jog distance.

14. The method of claim 11 further comprising the steps of:

measuring said radial offset between said read element and said write element for said track as an element offset distance signal; and generating a first and a second micro-jog distance signal for said first and second micro-jog distances from said element offset distance signal.

15. The method of claim 14 wherein said measuring said radial offset step includes:

positioning said read element aligned with said servo information centerline;

writing test data along a portion of said track with said write element, said test data having a test data centerline;

sensing said servo information and generating a first head position signal for the position of said read element aligned with said servo information centerline;

positioning said read element aligned with said test data centerline;

sensing said servo information and generating a second head position signal for the position of said read element aligned with the test data centerline; and generating said element offset distance signal representing the difference of said first and second head position signals.

16. The method of claim 15, wherein:

said positioning said read element aligned with said test data centerline step includes reading the test data and moving the read element so as to minimize the error rate in reading said test data.

17. The method of claim 14 wherein said measuring said radial offset step includes:

positioning said read element a micro-jog distance estimated for said track from said servo information centerline;

writing test data along a portion of said track with said write element, said test data having a test data centerline;

sensing said servo information and generating a first head position signal for the position of said read element aligned with said servo information centerline;

positioning said read element aligned with said test data centerline;

sensing said servo information and generating a second head position signal for the position of said read element aligned with the test data centerline; and generating said element offset distance signal representing the difference of said first and second head position signals.

18. The method of claim 17, wherein:

said positioning said read element aligned with said test data centerline step includes reading the test data and moving the read element so as to minimize the error rate in reading said test data.

19. The method of claim 14, wherein:

said first and second micro-jog distance signals are substantially equal to one half of said element offset distance signal.

20. The method of claim 14, wherein:

said measuring step includes measuring said radial offset for a plurality of tracks on the disk; and said generating step includes generating said first and second micro-jog distance signals for each track on the disk.

* * * * *